(12) United States Patent
Nakamoto

(10) Patent No.: US 9,170,760 B2
(45) Date of Patent: Oct. 27, 2015

(54) DEVICE, METHOD, AND RECORDING MEDIUM FOR OUTPUTTING IMAGE

(71) Applicant: CANON KABUSHIKI KAISHA, Tokyo (JP)

(72) Inventor: Juri Nakamoto, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 14/065,843

(22) Filed: Oct. 29, 2013

(65) Prior Publication Data

US 2014/0118754 A1     May 1, 2014

(30) Foreign Application Priority Data

Oct. 30, 2012   (JP) ................................ 2012-239284

(51) Int. Cl.
*G06F 3/12*     (2006.01)

(52) U.S. Cl.
CPC ............ *G06F 3/1208* (2013.01); *G06F 3/1232* (2013.01); *G06F 3/1256* (2013.01); *G06F 3/1285* (2013.01)

(58) Field of Classification Search
None
See application file for complete search history.

(56) References Cited

U.S. PATENT DOCUMENTS

| | | | | |
|---|---|---|---|---|
| 8,489,331 | B2* | 7/2013 | Kopf et al. | 701/532 |
| 8,504,945 | B2* | 8/2013 | Jakobson et al. | 715/855 |
| 8,878,872 | B1* | 11/2014 | Raghu et al. | 345/629 |
| 8,902,260 | B2* | 12/2014 | Kuhne | 345/661 |
| 2008/0068380 | A1* | 3/2008 | McAvoy et al. | 345/428 |
| 2009/0033999 | A1* | 2/2009 | Nishiyama | 358/1.18 |
| 2009/0059305 | A1* | 3/2009 | Ricard | 358/3.23 |
| 2011/0235064 | A1* | 9/2011 | Arai | 358/1.2 |

FOREIGN PATENT DOCUMENTS

JP         3494920 B2     2/2004

* cited by examiner

*Primary Examiner* — Jeremiah Bryar
(74) *Attorney, Agent, or Firm* — CANON USA, INC. IP Division

(57) ABSTRACT

A device generating a drawing to be output determines a scale of the drawing based on a size of an output area and generates a drawing to be output based on the determined scale. In this way, a drawing with an appropriate scale can be generated.

17 Claims, 10 Drawing Sheets

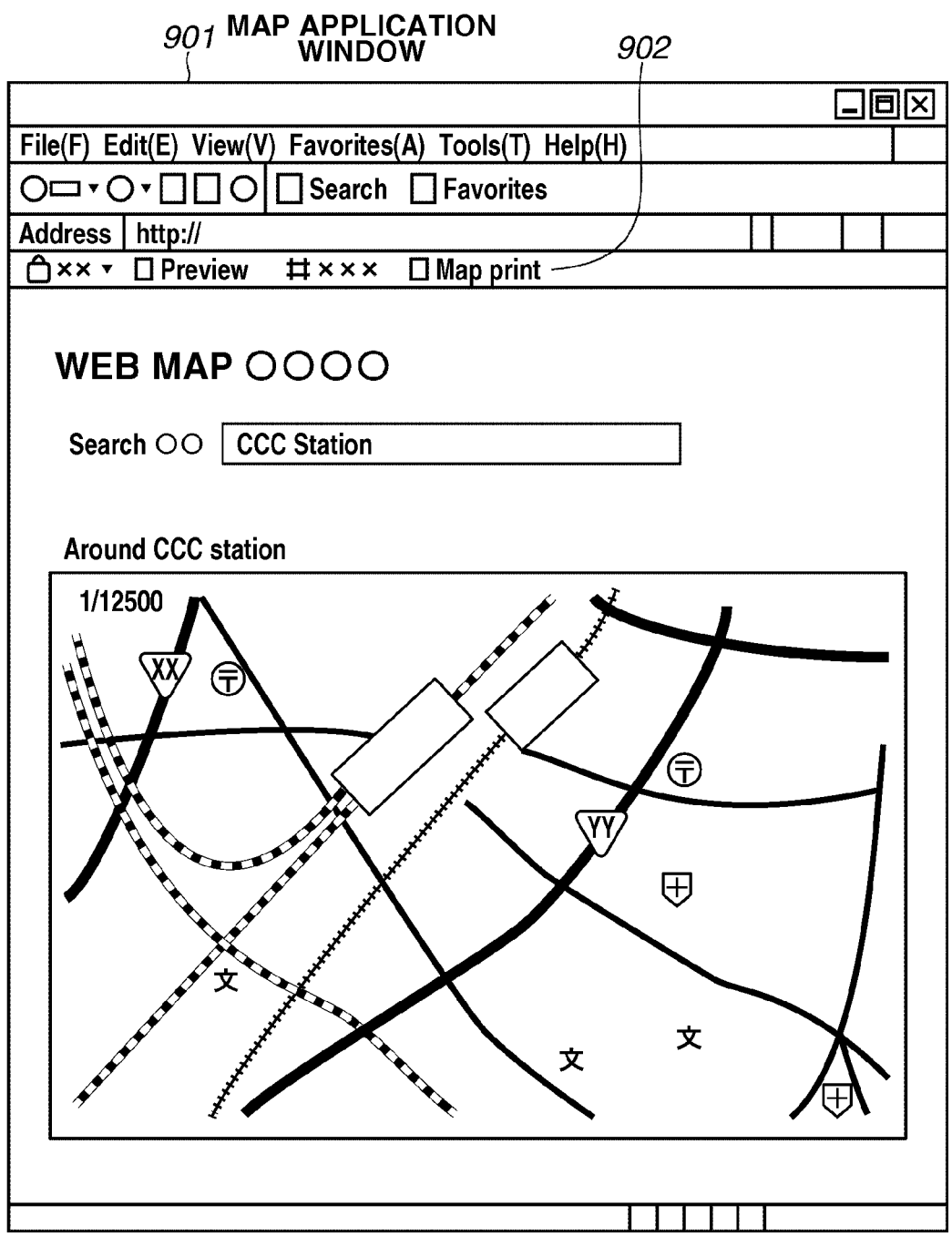

FIG.10

| |
|---|
| 1/3125 |
| 1/6250 |
| 1/12500 |
| 1/25000 |
| 1/50000 |

DEVICE, METHOD, AND RECORDING MEDIUM FOR OUTPUTTING IMAGE

BACKGROUND

1. Technical Field

The present disclosure relates to a device, a method, and a recording medium for generating a drawing to be output.

2. Description of the Related Art

It has conventionally been known that a computer such as a personal computer (PC) displays a map on a display screen, based on map data stored in a memory. Japanese Patent No. 3494920 discusses displaying a map stored in a memory in a PC or in a server on a network, on a display screen.

However, when a drawing such as a map is output in a case of the above conventional technique, the drawing may not be output with a scale appropriate for the size of an output target area.

For example, if a printing device prints a large-scale map including detailed information on a small print medium, the detailed information about geographical names, building names, etc. included in the map is printed in small sizes. Thus, when viewing the map on the print medium, the user may not grasp such detailed information. In addition, since the detailed information is printed on a small print medium, the user may find it actually difficult to view necessary information about streets, etc. In an opposite manner, a small-scale map including general information may be printed on a large print medium. In such case, while the map has been printed on a large print medium, detailed information about geographical names, etc. may not be printed.

SUMMARY

The present disclosure is directed to a device, a method, and a recording medium capable of generating a drawing with an appropriate scale.

According to an aspect of the present invention, a device generating a drawing to be output includes an acquisition unit configured to acquire information for identifying a size of an output area in which the drawing is output, a determination unit configured to determine a scale of the drawing based on the size of the output area identified by the information acquired by the acquisition unit, and a generation unit configured to generate the drawing to be output based on the scale determined by the determination unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 9 illustrates an operation screen of a map application.

FIG. 10 illustrates a scale list.

DESCRIPTION OF THE EMBODIMENTS

Figure 1:
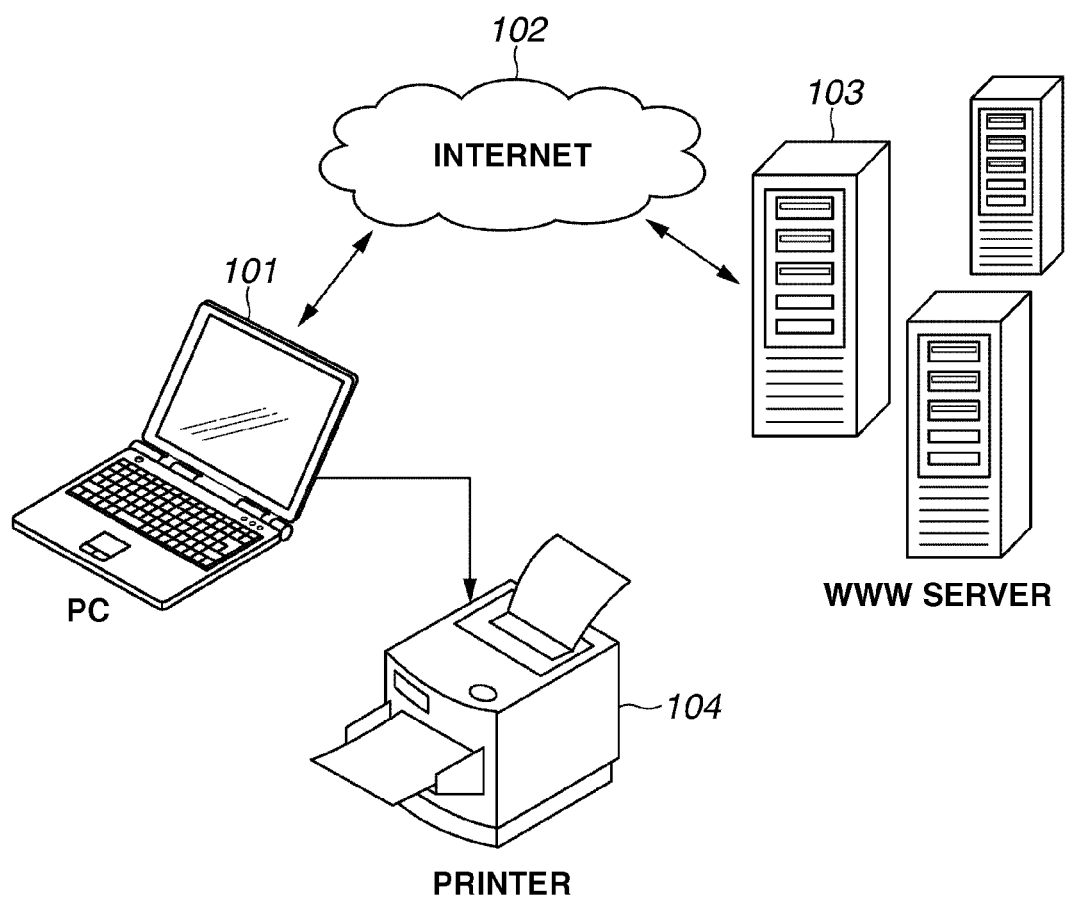
FIG. 1 illustrates a map output system.

Various exemplary embodiments, features, and aspects of the invention will be described in detail below with reference to the drawings.

The following exemplary embodiment does not limit the present invention. Not all the combinations of features described in the present exemplary embodiment are necessarily essential for the solution achieved by the present invention. For example, in the present exemplary embodiment, a map is used as an example of a drawing to be output on an output area. However, other than a map, the drawing may be a design or a model drawing.

FIG. 1 illustrates an example of a map output system. In FIG. 1, a personal computer (PC) 101 acquires a map image from WWW servers 103 via the Internet 102. The PC 101 displays the acquired map on a display unit of the PC 101 or on a display device connected to the PC 101. In addition, the PC 101 is connected to a printer 104 and can cause this printer 104 to print the map image acquired from the WWW server 103 on a print medium such as a sheet.

Figure 2:
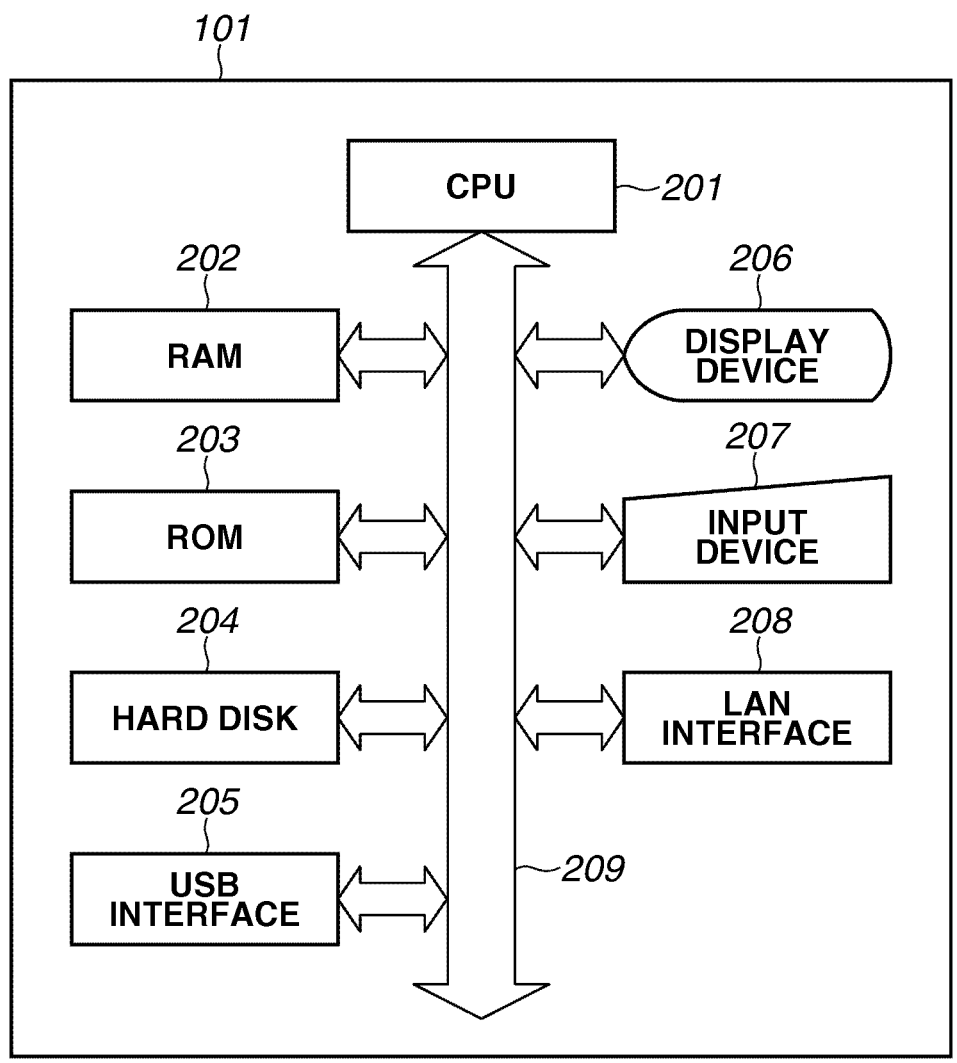
FIG. 2 is a block diagram illustrating a configuration of a PC.

FIG. 2 is a block diagram illustrating a configuration of the PC 101. A central processing unit (CPU) 201 calculates, determines, and controls data and commands, in accordance with a program stored in a random access memory (RAM) 202, a read-only memory (ROM) 203, or a hard disk 204. The RAM 202 is used as a temporary storage area when the CPU 201 performs various processing. The hard disk 204 stores an operating system (OS), a browser, and other application software, for example. By executing various programs stored in the ROM 203 and the hard disk 204 and by using the RAM 202 as a work memory, the CPU 201 performs various control operations on the PC 101.

A universal serial bus (USB) interface 205 is connected to a USB cable for performing data communication with the printer 104. Means other than a USB cable may be used to communicate with the printer 104. For example, the PC 101 may communicate with the printer 104 wirelessly or via a small computer system interface (SCSI).

A display device 206 includes a cathode-ray tube (CRT), a liquid crystal display, and a graphics controller. The CPU 201 performs display control to cause the display device 206 to display a map image downloaded from a WWW server 103, a print preview image, a graphic user interface (GUI), etc. In addition, by performing display control processing, the CPU 201 displays a drawing and a print preview of a drawing, which will be described below.

A user uses an input device 207 to give various instructions to the PC 101. Examples of the input device 207 include a mouse and a keyboard. A system bus 209 is used for data exchange among the CPU 201, the RAM 202, the ROM 203, the hard disk 204, etc.

A local area network (LAN) interface 208 is connected to a LAN cable to perform data communication with the external WWW servers 103 via a router or the Internet 102 (not illustrated). This data communication may be performed wirelessly by using an interface adaptable to wireless communication.

FIG. 2 illustrates a laptop PC as the PC 101. Namely, the display device 206 and the input device 207 are integrated with a control unit including the CPU 201, RAM 202, etc. However, alternatively, the PC 101 may be a desktop PC. Namely, the display device and the input device may be provided separately.

Figure 3:
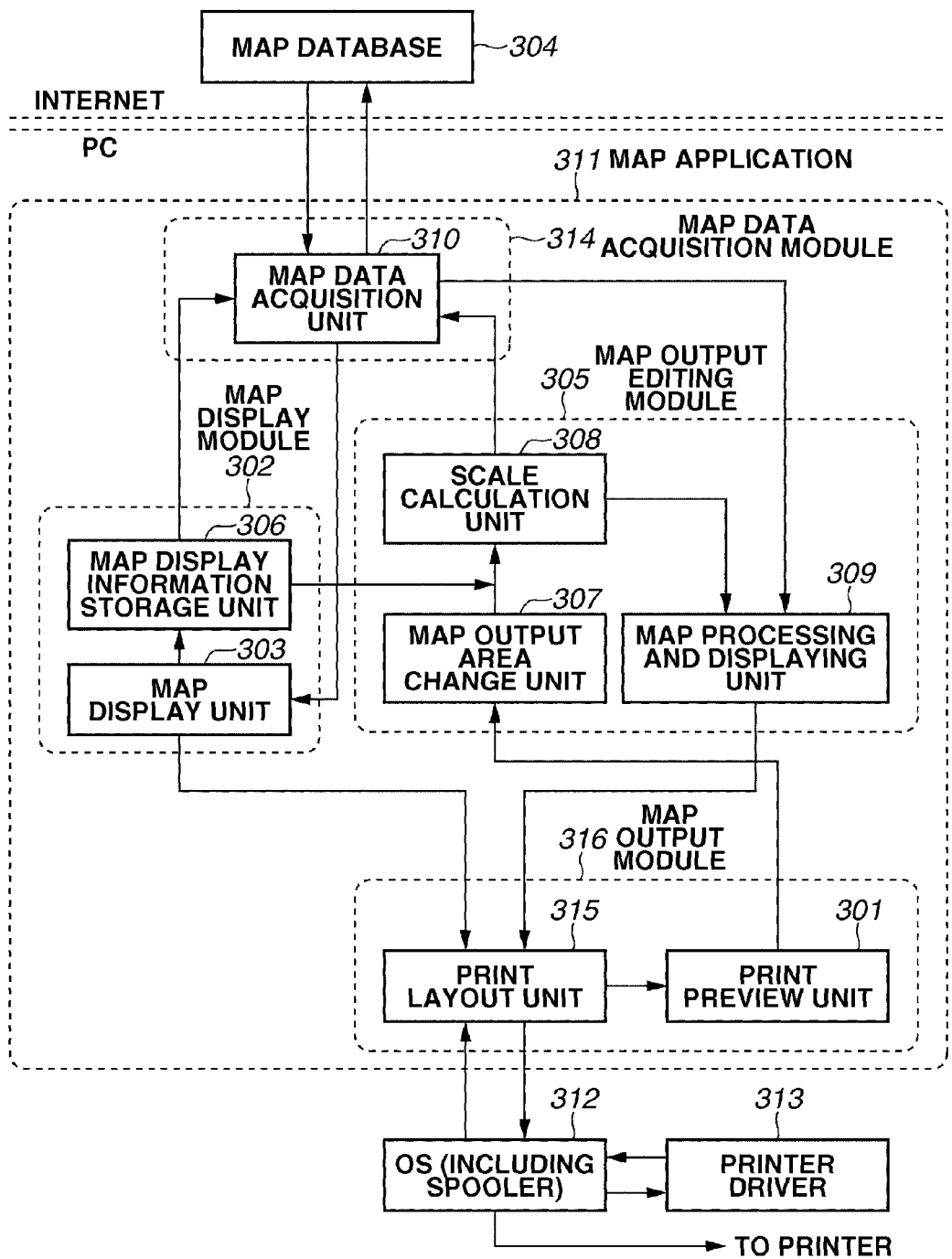
FIG. 3 is a block diagram illustrating a configuration of software on the PC.

FIG. 3 is a block diagram illustrating a configuration of software on the PC 101. A program that operates on the PC 101 and a data processing configuration of the program will be described with reference to FIG. 3 as follows. A map application 311, which will be described below, is started and executed by the CPU 201. More specifically, when the CPU 201 executes a program corresponding to the map application 311 stored in the hard disk 204, functions of the map application 311 are realized.

In FIG. 3, a map database 304 exists on the Internet and stores map information. More specifically, the map database 304 stores map information corresponding to maps with a plurality of scales with respect to various positions (latitudes, longitudes). To provide the map application 311 with map images, the map database 304 uses a WEB Application Programming Interface (WEBAPI). More specifically, the map application 311 of the PC 101 uses the WEBAPI and transmits positional information indicating a latitude and a longitude in a map, and scale information indicating a scale of the map, to the map database 304. By transmitting such positional information, the map application 311 requests the map database 304 to transmit map data. Based on the positional information and the scale information received from the PC 101 and by using the WEBAPI, the map database 304 transmits a map image of an area corresponding to the latitude, longitude, and scale indicated by the information, to the PC 101.

In this way, by transmitting a position (latitude, longitude) and a scale of a map to the map database 304, the map application 311 requests map data. As a result, the map application 311 can acquire map data corresponding to the transmitted positional and scale information.

The data format of the map data stored in the map database 304 and transmitted to the map application 311 may be a bitmap format or a vector format.

In addition, in the present exemplary embodiment, based on the map data acquired by the map application 311, the PC 101 causes the printer 104 to print a map on a print medium. The map application 311 requests the map database 304 to transmit a map on a scale suitable for a print area of a print medium on which the map is to be printed. As a result, the map application 311 acquires a suitable map. For example, if the print area is small, the map application 311 acquires a simple, small-scale map including only general information. In contrast, if the print area is large, the map application 311 acquires a large-scale map including detailed information.

Namely, if the print area is small, the user may not be able to read detailed information when viewing the print product. In such a case, the printer 104 prints a simple map in which less information about geographical names, etc. is printed. In contrast, if the print area is large, the user can read detailed information when viewing the print product. In such a case, the printer 104 prints a map in which much information is printed. Thus, the printer 104 can print a map which shows appropriate information for the user who views the print product.

Next, a configuration of the map application 311 will be described in detail. The map application 311 includes four modules as main modules. A map data acquisition module 314 makes a request for map data to the map database 304 and acquires map data based on the request.

A map display module 302 causes the display device 206 to display a map image, based on the map data acquired by the map data acquisition module 314. In addition, the map display module 302 provides the map data acquisition module 314 with a scale, a latitude, and a longitude of a map to be displayed.

In accordance with an instruction from the user, a map output editing module 305 receives a scale, a latitude, and a longitude of a map, creates information indicating the received scale, latitude, and longitude (positional information and scale information), and transmits the information to the map data acquisition module 314. In addition, the map output editing module 305 performs magnification processing on the map data acquired by the map data acquisition module 314, to increase or reduce the map scale. In addition, the map output editing module 305 cuts out a partial map area. The map output editing module 305 transmits such edited data to a map output module 316.

The map output module 316 outputs the map data displayed by the map display module 302 or the map data edited by the map output editing module 305.

As described above, the map application 311 includes the above four modules. By controlling these modules in conjunction with each other, the CPU 201 performs various processing, including acquisition of map data and displaying, editing, and printing of a map. Next, each of the modules will be described in detail.

The map data acquisition module 314 includes a map data acquisition portion 310. The map data acquisition portion 310 receives positional information indicating a latitude and a longitude of a map and scale information indicating a scale of a map, from the map display module 302 or from the map output editing module 305. The map data acquisition portion 310 requests map data, by transmitting the received positional information and scale information to the map database 304. The map data acquisition portion 310 receives map data transmitted in response to the request from the map database 304.

The map display module 302 acquires the map data from the map data acquisition portion 310. By outputting a map image to the display device 206 based on the acquired map data, the map display module 302 causes the display device 206 to display the map image. If the map data is vector data, rendering processing is performed on the vector data to obtain bitmap data. Next, the map display module 302 outputs the rendered bitmap data to the display device 206.

A map display information storage portion 306 stores positional information (latitude and longitude information) about a map displayed by a map display unit 303. The map display information storage portion 306 also stores the size of the map on a screen and the scale of the map. The map display information storage portion 306 transmits these items of information to the map data acquisition module 314 or the map output editing module 305.

In addition, the map display information storage portion 306 stores information indicating a plurality of scales of map data stored in the map database 304. By referring to such information, the PC 101 can recognize the scales that can be used by the map application 311. For example, the map display information storage portion 306 stores the information in a list format, as a scale list. This scale list is originally stored in the map database 304 and acquired by the map data acquisition module 314 from the map database 304. For example, when the map application 311 is started or when the user gives an instruction for using a map in the map database 304, the scale list is acquired. At that time, the scale list is acquired by causing the map data acquisition module 314 to access the map database 304. The map display information storage portion 306 stores the acquired scale list.

Figure 10:
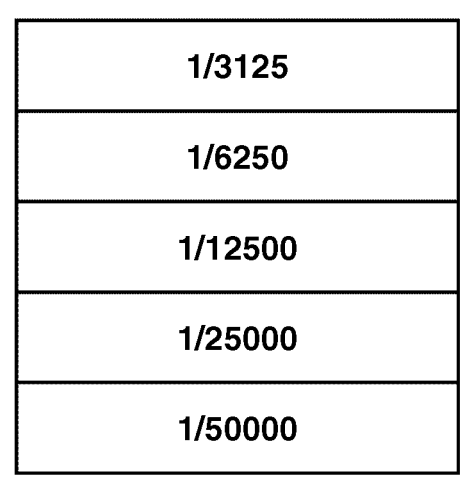

FIG. 10 illustrates an example of the scale list. In this example, the map database 304 stores five types of maps corresponding to five scales (1:3125, 1:6250, 1:12500, 1:25000, and 1:50000).

In the present exemplary embodiment, the map application 311 refers to this scale list, selects a map scale to be acquired from the map database 304, and transmits scale information indicating the selected scale to the map database 304.

The scale list is not necessarily stored in the map application 311. Namely, the map application 311 does not need to grasp the map scales in the map database 304. For example, if the map application 311 notifies the map database 304 of an arbitrary scale, the map database 304 may return a map on a scale closest to the arbitrary scale. Alternatively, if the map application 311 requests the map database 304 to transmit a larger/smaller-scale map with respect to a map being displayed, the map database 304 may return a map matching the request. If the map database 304 does not have a map matching the request, the map database 304 returns an error message.

The map output editing module 305 determines the scale of the map to be displayed by the map application 311 and requests the map data acquisition portion 310 to acquire a map on the determined scale. In the present exemplary embodiment, the map output editing module 305 is started when the size of the print area to be printed by a print preview unit 301 is changed.

The map output editing module 305 determines the size of the map output area, determines the map scale based on the size, and edits the map on the scale. In this way, a map on the scale based on the size of the map output area can be edited based on the map output area, and the edited map can be output.

Next, the map output editing module 305 will be described in more detail. When the print preview unit 301 changes the map output area, a map output area change portion 307 included in the map output editing module 305 calculates the size of the changed map output area. In the present exemplary embodiment, the map output area signifies a print area. For example, the size of the print area is changed based on a print setting set by an instruction from a user. For example, when the user changes the sheet size, the width of a margin, or the number of pages to be printed on a print sheet, the size of the print area on which a map is printed is changed.

A printer driver 313 sets the print setting based on an instruction from a user. Next, the print preview unit 301 acquires print setting information indicating the print setting set by the printer driver 313 via an OS 312 and a print layout unit 315. The print preview unit 301 displays a print preview image based on the acquired print setting information. When starting the map output editing module 305, the print preview unit 301 notifies the map output area change portion 307 of the print setting information. Next, the map output area change portion 307 calculates the horizontal and vertical size of the print area based on the print setting information.

Based on the size of the print area calculated by the map output area change portion 307, a scale calculation portion 308 calculates a scale corresponding to the size of the print area. More specifically, based on the size of the print area calculated by the map output area change portion 307, the scale calculation portion 308 selects a scale corresponding to the print area from among the scales included in the scale list stored in the map display information storage portion 306. Next, the scale calculation portion 308 notifies the map data acquisition portion 310 of scale information indicating the selected scale and positional information acquired from the map display information storage portion 306. Next, the map data acquisition portion 310 transmits the scale information and the positional information to the map database 304. Consequently, the map data acquisition portion 310 acquires a map based on the scale information and the positional information, from the map database 304.

A map processing and displaying portion 309 edits a map image acquired by the map data acquisition portion 310, based on the map output area. For example, the map processing and displaying portion 309 cuts out, joints, expands, or reduces a map image. More specifically, the map processing and displaying portion 309 acquires the print area size calculated by the map output area change portion 307 from the scale calculation portion 308 and edits a map image based on the calculated size. For example, the map processing and displaying portion 309 performs magnification processing on the map image so that at least one of the horizontal and vertical lengths of the map matches the print area size.

In addition, for example, if the print area is changed while a map on a certain scale is being displayed as a print preview, a map on a scale based on a new print area is acquired. In addition, if a map on a new scale is displayed, it may be desirable that a map having the same area as that of the map that has been displayed before the change of the print area should be displayed.

Thus, when a map on a new scale is acquired by a change of the print area, the map processing and displaying portion 309 edits the map. More specifically, the map processing and displaying portion 309 acquires scale information from the scale calculation portion 308. Next, based on the scale information used before and after the change of the print area, the map processing and displaying portion 309 identifies the area corresponding to the map that has been displayed as a print preview, out of the map newly acquired from the map data acquisition portion 310. Next, the map processing and displaying portion 309 cuts out an image in the identified area. The map processing and displaying portion 309 transmits such edited image to the map output module 316.

The map output module 316 performs output processing such as displaying and printing of a map image. Based on the print setting acquired from the printer driver 313, the print layout unit 315 determines a layout of a map image edited by the map processing and displaying portion and transmits the laid out image to the print preview unit 301. The print preview unit 301 causes the display device 206 to display the image acquired from the print layout unit 315.

In addition, the print layout unit 315 can start the printer driver 313 via the OS 312, based on an instruction from the user. The user can change a print setting by using an operation screen provided by the printer driver 313 started by the print layout unit 315.

The OS 312 provides an application programming interface (API) for exchanging print setting data between the map application 311 and the printer driver 313 and an API for performing drawing processing. The OS 312 includes various types of control software, such as a spooler system for managing print jobs and a port monitor for outputting printer commands to ports.

Based on a command from the map application 311, the printer driver 313 performs drawing processing on the data received from the map application 311 to generate print data. Next, the printer driver 313 transmits the print data to the printer 104 via the OS 312 and causes the printer 104 to print a map. In addition, based on a command from the map application 311 or one of various applications, the printer driver 313 causes the display device 206 to display an operation screen for setting a print setting. If a user inputs a print setting by using the operation screen, the printer driver 313 generates print data based on the print setting.

In the configuration described in FIG. 3, the map application 311 can acquire a map on a scale that is based on the output area, edit the map, and display/print the edited image.

The above description has been made with reference to FIG. 3, assuming that the map data is stored in the map database 304 outside the PC 101. However, the map data may be stored in the RAM 202, the ROM 203, or the hard disk 204 in the PC 101. Alternatively, the map data may be stored in a memory of a device connected to the PC 101 via the USB interface 205 or the LAN interface 208.

Figure 4:
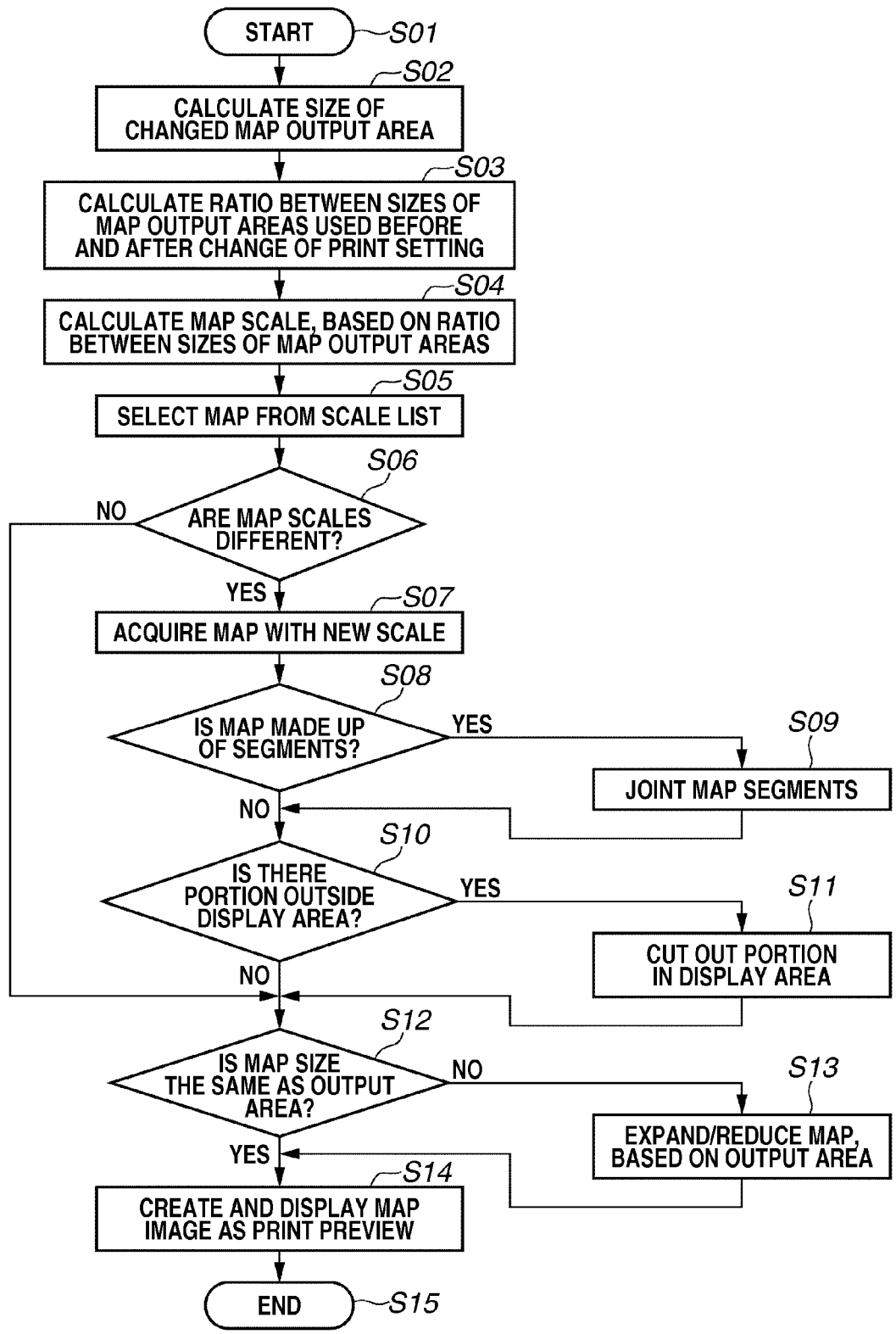
FIG. 4 is a flow chart illustrating a procedure of processing performed by a map output editing module.

FIG. 4 is a flow chart illustrating a procedure of processing performed by the map output editing module 305. A program for realizing the processing that is illustrated in this flow chart and that is performed by the map output editing module 305 is stored in the hard disk 204, as part of the program of the map application 311. The processing illustrated in FIG. 4 can be realized when the CPU 201 uses the RAM 202 as a work memory and executes the program.

In step S01, the print preview unit 301 starts the map application 311, so that the flow chart is started. For example, when the print preview unit 301 of the map application 311 is displaying a preview, if a user gives an instruction to change the print area, the print preview unit 301 starts the map output editing module 305. At this timing, the print preview unit 301 transmits print setting information to the map output area change portion 307.

In step S01, the print preview unit 301 is displaying a print preview of a map on a scale arbitrarily selected by the user or on a scale set as an initial setting of the map application 311. The scale is stored in the map display information storage portion 306. If the user gives an instruction to change the print area, step S02 and its subsequent steps are performed to display a preview of the map on a scale based on the newly-changed print area.

In step S02, based on the print setting information, the map output area change portion 307 calculates the horizontal and vertical lengths of the map output area. As print settings, the print setting information indicates a sheet size, a margin width, and the number of pages allocated to a single sheet, for example. Based on these print settings, the map output area change portion 307 determines the size of the print area on a print medium such as a sheet, as the map output area.

In step S03, the map output area change portion 307 calculates the ratio between the sizes of the map output areas used before and after the change of the print setting. When the map output area change portion 307 acquires the print setting information from the print preview unit 301, the print setting information is stored. In this way, the map output area change portion 307 can calculate the ratio between the sizes of the map output areas (print areas) used before and after the change of the print setting.

If the print setting of a display target map is changed for the first time, the map output area change portion 307 calculates the ratio between the sizes of the print areas, based on the difference between the print setting acquired in step S02 and the default print setting stored in the ROM 203.

In step S04, the scale calculation portion 308 calculates a scale corresponding to the changed print area, based on the print area ratio calculated by the map output area change portion 307 in step S03 and the scale information stored in the map display information storage portion 306. In the present exemplary embodiment, the scale calculation portion 308 calculates a scale so that the print area ratio matches the scale ratio. For example, when a map on a scale of 1:25000 is being displayed as a print preview image, if a user doubles the print area, the scale calculation portion 308 makes a calculation on a scale of 1:50000.

In step S05, by referring to the scale list acquired from the map display information storage portion 306, the scale calculation portion 308 selects a map corresponding to the scale calculated in step S04 from the maps of a plurality of scales stored in the map database 304. In this step, as a map selection condition, for example, a map on a scale closest to the scale calculated in step S04 is selected.

In step S06, by comparing the scales used before and after the change of the map output area, the scale calculation portion 308 determines whether to acquire a new map in response to the change of the map output area. More specifically, the scale calculation portion 308 compares the scale used before the change of the map output area indicated by the scale information acquired from the map display information storage portion 306, with the scale calculated in step S04.

In step S06, it is determined whether the scales used before and after the change of the map output area are different. If the scales are different (YES in step S06), the processing proceeds to step S07. In step S07, the scale calculation portion 308 causes the map data acquisition portion 310 to acquire a map corresponding to the change of the map output area. In this example, the scale calculation portion 308 notifies the map data acquisition portion 310 of the positional information of the map stored in the map display information storage portion 306 and the scale of the map selected in step S05. Accordingly, the map data acquisition portion 310 acquires map data which represents the area corresponding to the latitude and the longitude indicated by the positional information and the scale supplied from the scale calculation portion 308, from the map database 304. The map data is transmitted to the map processing and displaying portion 309.

In the map database 304, a map is divided into predetermined areas. The map database 304 stores a plurality of maps each of which corresponds to one of these areas. In step S07, if the area of the map that the map data acquisition portion 310 requests the map database 304 to transmit extends over a plurality of maps in the map database 304, the map data acquisition portion 310 acquires map data corresponding to the plurality of maps. Then, the map processing and displaying portion 309 acquires the plurality of segment maps which it requests, from the map data acquisition portion 310.

In step S08, the map processing and displaying portion 309 determines whether the map acquired in step S07 is made up of segments. In this example, if a plurality of maps is acquired in step S07, the map processing and displaying portion 309 determines that the map is made up of segments.

In step S08, if the map processing and displaying portion 309 determines that the map is made up of a plurality of segment maps (YES in step S08), the processing proceeds to step S09. In step S09, the map processing and displaying portion 309 joints the segments of the map. In this example, information indicating the jointing positions of the maps is added to the map in the map database 304. In step S08, the map processing and displaying portion 309 joints the segments based on the jointing positions indicated by the information. Alternatively, the map processing and displaying portion 309 may determine the jointing positions of a map by analyzing the plurality of the maps.

In step S10, the map processing and displaying portion 309 determines whether the map acquired by the map data acquisition portion 310 includes any portion that is outside the display area. In this example, the map processing and displaying portion 309 acquires scale information and positional information from the scale calculation portion 308, and based on these items of information, determines the area of the map displayed before the change of the output area. If the map newly acquired in step S08 includes such area that is determined in the above way, the map processing and displaying portion 309 determines that the external area is a portion outside the display area.

In step S10, if the map processing and displaying portion 309 determines that a newly acquired map includes a portion outside the display area (YES in step S10), the map processing and displaying portion 309 deletes the portion in step S11 to cut out the display area of the map.

Next, in step S12, the map processing and displaying portion 309 compares the size of the map output area after the change of the map output area with the size of the map to be output. As a result of the size comparison in step S12, if the map processing and display unit 309 determines that sizes are different, the processing proceeds to step S13. In step S13, the map processing and displaying portion 309 performs map expansion/reduction processing so that the size of the map output area and the size of the map to be output match each other. If both the map output area and the map are rectangular, magnification processing is performed so that the map output area and the map match each other in either the horizontal length or the vertical length.

In step S14, the map processing and displaying portion 309 generates a map image to be output based on the map data acquired through steps S06 to S13 and causes the print preview unit 301 to display the map image as a print preview via the print layout unit 315. After causing the print preview unit 301 to redisplay the map, the processing proceeds to step S15. In step S15, the map output editing module 305 ends the present processing.

Thus, if a user gives an instruction to change the size of the output area of a map, the map output editing module 305 performs the processing illustrated in FIG. 4, to acquire new map data with a scale based on the size of the changed output area. In addition, the map corresponding to the map data is edited based on the area of the map that has been displayed and the new output area. As a result, the edited map is output to the output area.

Thus, through the processing performed by the map output editing module 305, a map having the same area as that of the map that has been displayed before the change of the output area and having a different scale from that of the map used before the change can be output, in conformity to the output area.

In the above step S05, a map on a scale closest to that calculated in step S04 is selected from among the maps included in the scale list. However, alternatively, a map on a scale closest to the scale calculated in step S04 or less, or a map on a scale closest to a scale calculated in step S04 or more may be selected.

Next, a map that is output after the processing in FIG. 4 is performed will be described. The following description is based on an example where display processing is output processing.

FIG. 9 illustrates an operation screen of the map application 311. A map application window 901 is a window of the map application 311. A user can specify a map scale by using the map application 311. In FIG. 9, a user has specified a scale of 1:12500, and a map on that scale is displayed by the map application 311.

For example, if the user uses a mouse and presses a map print button 902, the print preview unit 301 displays a print preview of the map displayed on the window, based on print settings. If the user changes a print setting while the print preview is displayed, the print preview changes.

FIG. 5 illustrates a change of a print preview when a print setting is changed. With reference to FIG. 5, an example where the size of the output area is increased by a change of a print setting will be described.

Figure 5A:
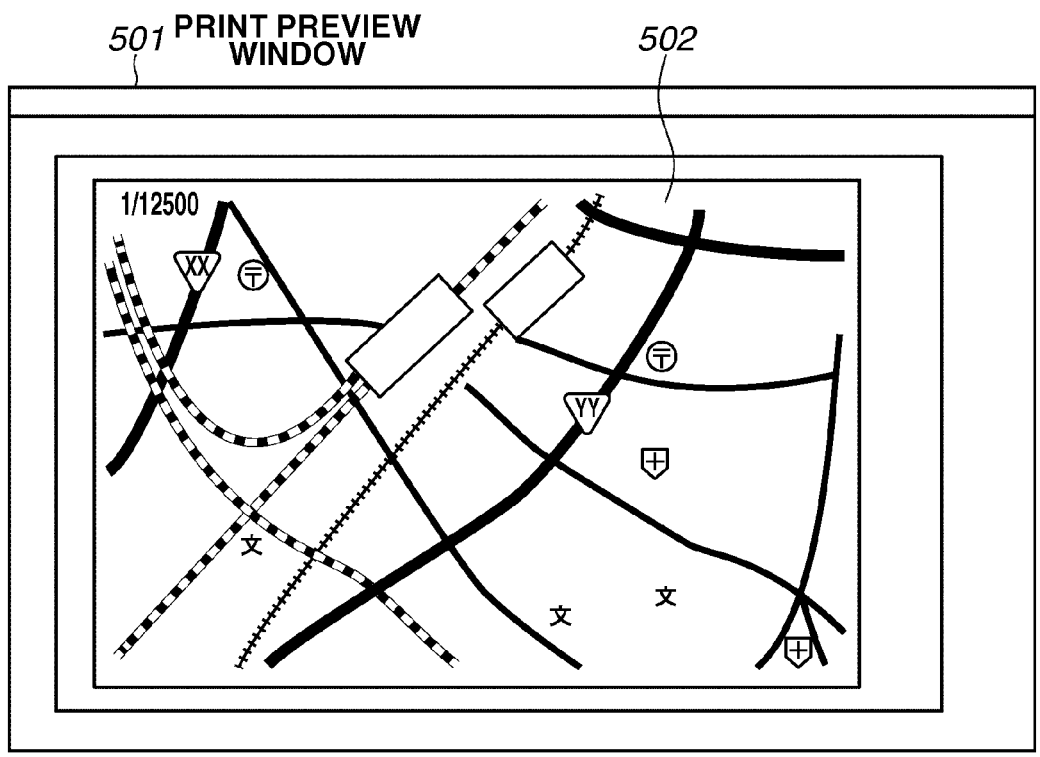
FIGS. 5A and 5B illustrate a change of a print preview made when a print setting is changed.

If a user presses the map print button 902 in FIG. 9, a print preview window 501 illustrated in FIG. 5A is displayed. The following description will be made, assuming that the map database 304 exists on the Internet and stores maps on five scales of 1:3125, 1:6250, 1:12500, 1:25000, and 1:50000 as illustrated in FIG. 10. The scale of the map displayed in a map output area 502 in FIG. 5A is 1:12500. A size A4 is set as a print setting in the print preview in FIG. 5A.

As described with reference to FIG. 9, the user has given an instruction to display a print preview while the map on a scale of 1:12500 is displayed. As a result, a map on a scale of 1:12500 has been displayed as a print preview.

If the user changes the sheet size from A4 to A2 by using a print setting screen (not illustrated) while the print preview window 501 in FIG. 5A is displayed, in step S02 in FIG. 4, the map output area corresponding to size A2 is calculated (the size of the area on which a map is printed when a sheet of size A2 is used). Next, in step S03, the ratio between the output areas used before and after the change (ratio between the sizes A4 and A2) is calculated. In this case, the sheets used before and after the change have the same aspect ratio. However, since a sheet used after the change is four times as large as a sheet used before the change, the ratio between the sizes of the output areas is determined to be four times. Thus, in step S04, the scale calculation portion 308 selects a scale of 1:3125, which is four times as large as the current scale of 1:12500.

Figure 5B:
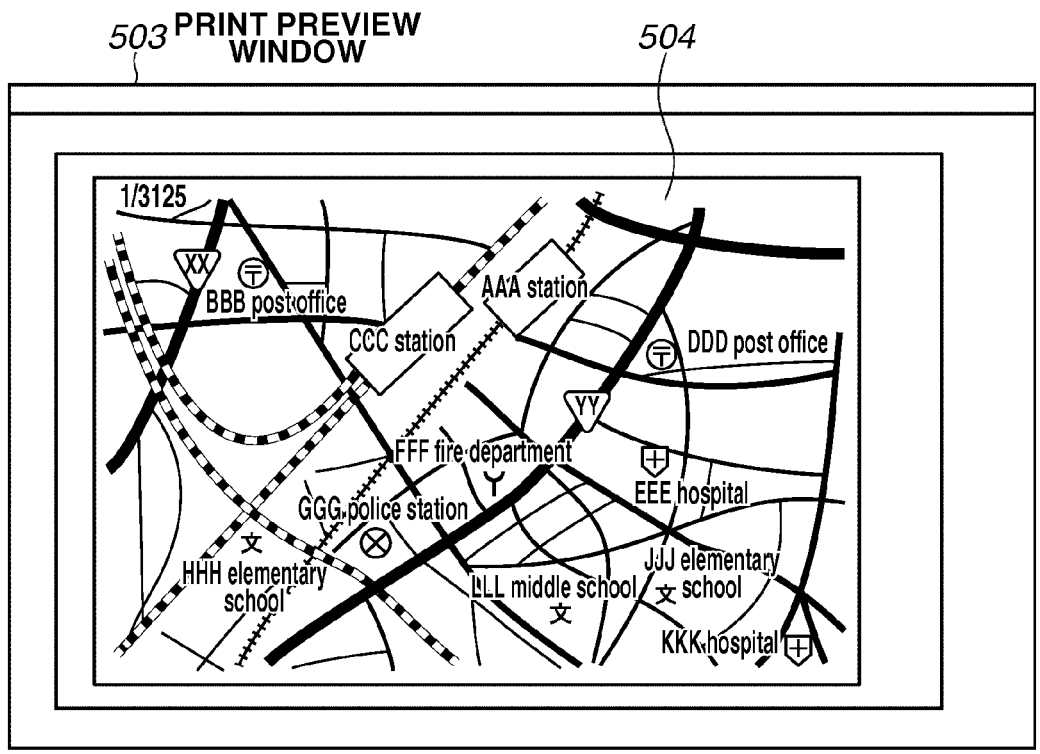

Subsequently, in step S07, a map on a scale of 1:3125 is acquired, and a print preview is displayed in a print preview window 503 as illustrated in FIG. 5B. This print preview window 503 has the same size as that of the print preview window 501 in FIG. 5A. It is clear from a map output area 504 in FIG. 5B that the map in FIG. 5B has a scale larger than that of the map illustrated in FIG. 5A and includes names of stations, buildings, etc. If such names are printed on an A4-size sheet, the user cannot read the text content. Namely, it will be more difficult to read the map. However, if such names are printed on an A2-size sheet as illustrated in FIG. 5B, since the size of the area on which the map is printed is larger than that of an A4-size sheet, the user can correctly read the text content.

Thus, in the present exemplary embodiment, for example, if the sheet size is changed, the size of the output area is accordingly increased. Since a detailed map on a larger scale is output, an appropriate map based on the size of the output area can be output.

If a map on a different scale as illustrated in FIG. 5B is newly acquired, there are cases where a map of a wider area than the display area shown in FIG. 5A could be acquired from the map database. In such cases, the area that has been displayed is cut out in step S11 in FIG. 4, and in step S13, the cutout portion is magnified based on the new output area (an area in an A2-size sheet). Thus, the print preview window in FIG. 5B can appropriately be displayed.

Contrary to the example illustrated in FIGS. 5A and 5B, if the print setting is changed to reduce the output area, a general map on a smaller scale is output. For example, the print preview in FIG. 5B is changed to the print preview in FIG. 5A.

The above exemplary embodiment has been described based on an example where a print setting for changing the map output area is changed. However, alternatively, the size of the output area may be changed when the user adjusts the map output area on a display screen.

FIG. 6 illustrates a change of a print preview when the user changes the map output area.

Figure 6A:
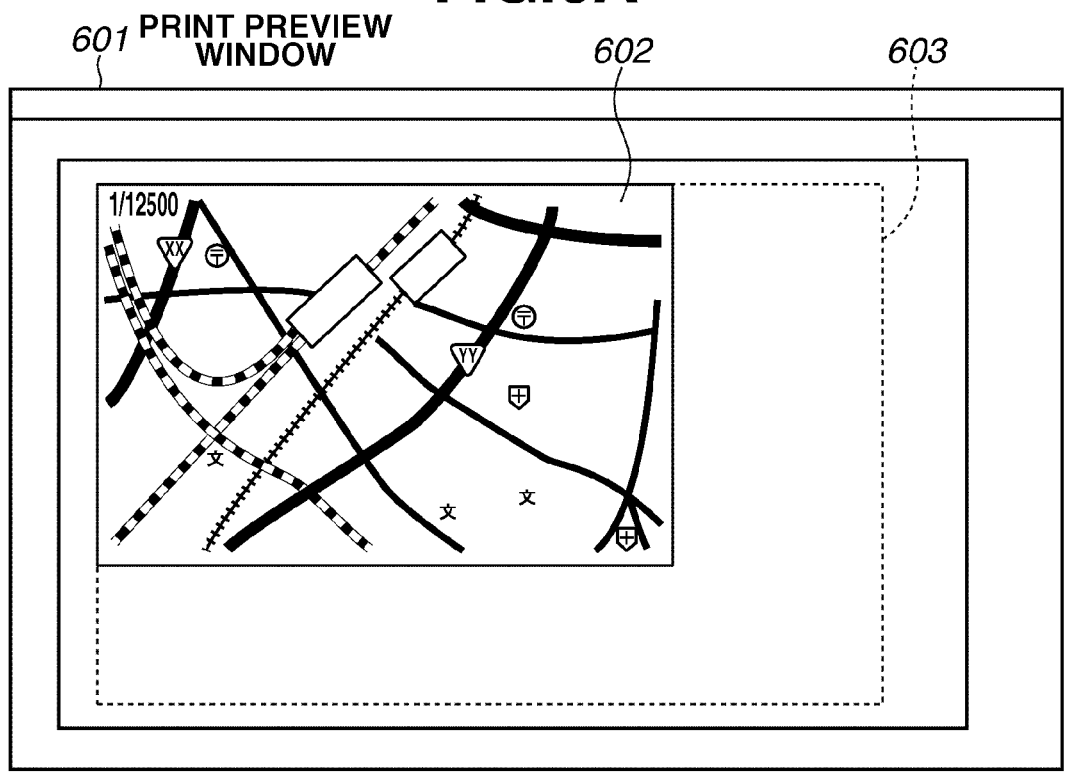
FIGS. 6A and 6B illustrate a change of a print preview made when a map output area is changed by a user.

If the user presses the map print button 902 on the application screen, a map output area 602 in FIG. 6A is displayed as a print preview. Simultaneously, a dotted-line frame 603 for the user to specify the output area of the map is also displayed. On a print preview window 601, the user uses the input device 207 such as a mouse to drag any one of the four corners of the dotted-line frame 603. In this manner, the size of the dotted-line frame 603 is expanded or reduced. In this way, the user can adjust the size of the map output area.

In an initial print preview state, the dotted-line frame 603 matches the map output area 502. If the user expands the dotted-line frame 603 to a size illustrated in FIG. 6, as illustrated in FIG. 6B, the size of the map output area 502 can be expanded to the size of a map output area 606.

In this example, when the user completes the dragging operation for adjusting the size of the dotted-line frame 603, the map output editing module 305 starts the processing illustrated in FIG. 4. In step S02, the size of the changed dotted-line frame 603 is calculated. In step S04, the ratio between the sizes of the map output areas used before and after the change of the magnification is calculated. In step S07, a map on a scale based on that ratio is acquired.

Figure 6B:
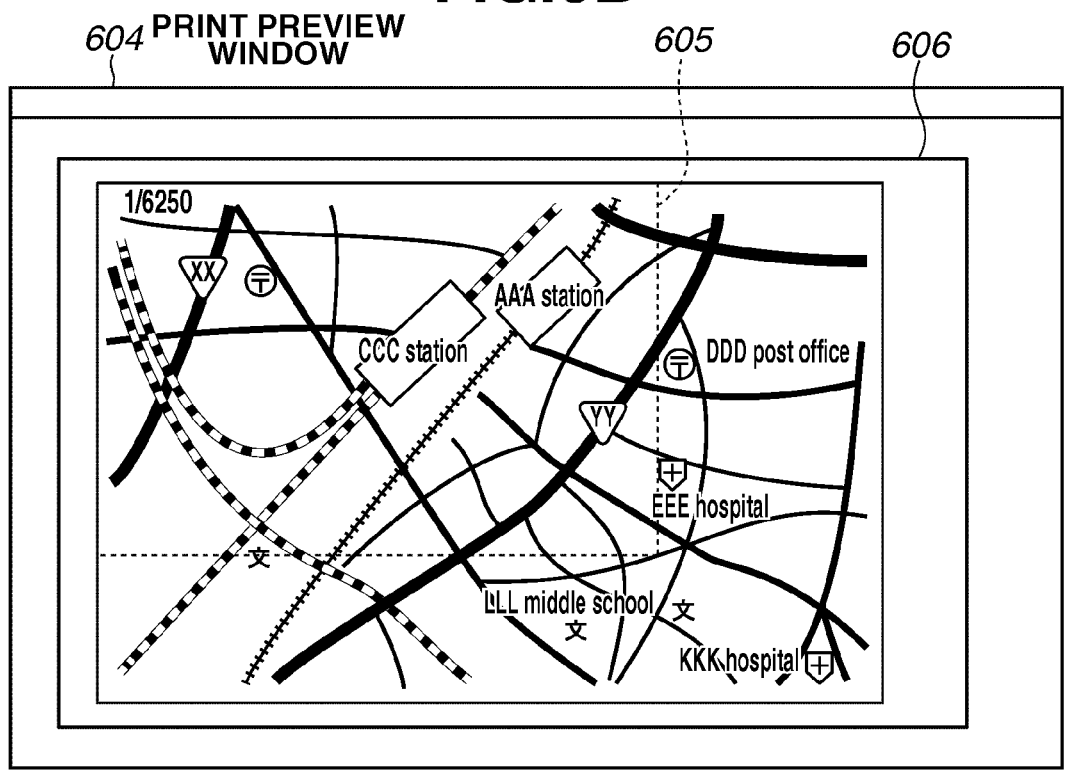

According to the present example in FIGS. 6A and 6B, the size of the new map output area 606 after the expansion is twice the size of the map output area 606 before the expansion. In such a case, in step S04, a scale of 1:6250, which is twice a scale of 1:12500, is adopted. Thus, in step S05, a map on a scale of 1:6250 is selected from the scale list, and in step S07, such map is newly acquired. In step S05, if no map on the scale calculated in step S04 exists in the scale list, a scale closest to the calculated scale is selected from the scale list.

The map output editing module 305 cuts out the area displayed in FIG. 6A from the newly-acquired map on a scale of 1:6250. In addition, the cutout map is expanded or reduced to match the map output area 606.

Consequently, as illustrated in FIG. 6B, since a map including more detailed information than the map in FIG. 6A is displayed in an output area wider than that in FIG. 6A, the user can correctly read more detailed information.

Contrary to the example illustrated in FIGS. 6A and 6B, if the user reduces the size of the output area, a rough map on a scale smaller than that used before the size reduction is displayed. For example, if, in the state in FIG. 6B, the user reduces the output area up to the size of a dotted-line frame 605, the output area is reduced by ½. Thus, a map on a scale of 1:25000, which is ½ of a scale of 1:6250, is acquired. As a result, the map as illustrated in FIG. 6A is displayed. In this way, if the output area is smaller, a simple small-scale map that does not include detailed information is displayed. Namely, even when reading a small map, the user can correctly read information in the map.

Further, when a user gives an instruction to change the size of the output area as illustrated in FIG. 6, there are cases where the aspect ratio of the map is changed between before and after the size change. FIG. 7 illustrates a change of a print preview when the aspect ratio of the map output area is changed.

Figure 7A:
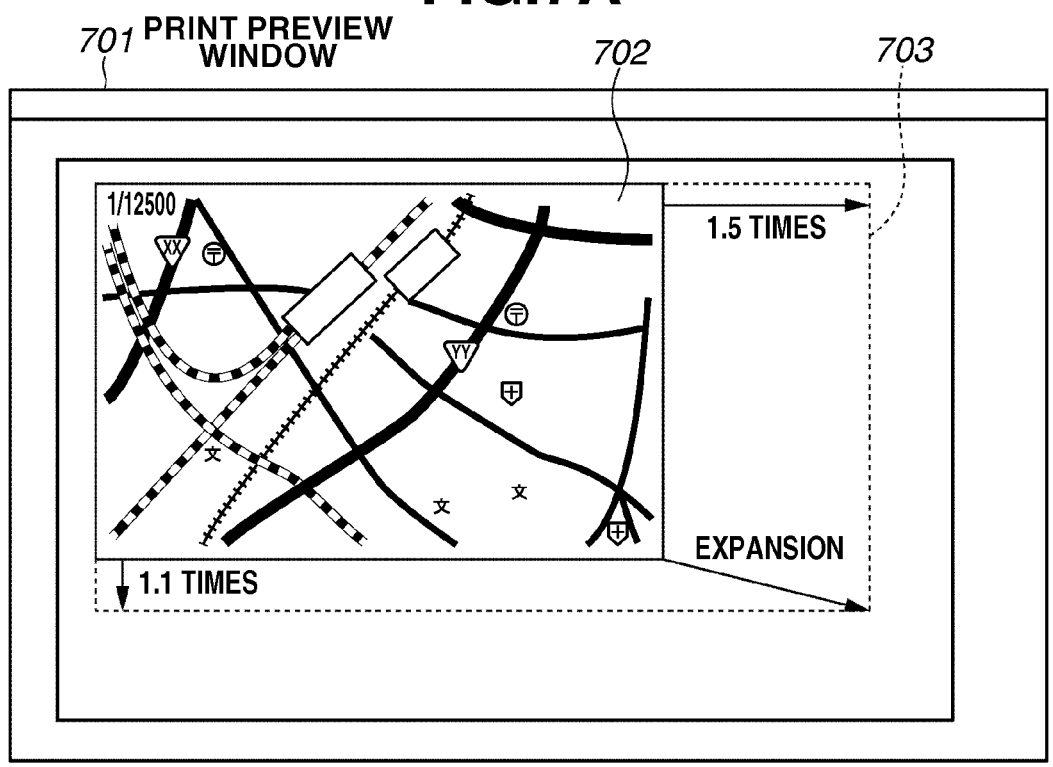
FIGS. 7A and 7B illustrate a change of a print preview made when the aspect ratio of the map output area is changed.

A print preview window 701 is displayed when the map application 311 displays a print preview. The scale of the map displayed in a map output area 702 is 1:12500. In this state, the user expands the size of the map output area 702 to a size as illustrated in FIG. 7A. The user expands the horizontal and vertical lengths of the map output area 1.5 times and 1.1 times, respectively, so that the map output area 702 is expanded to a map output area 703.

Figure 7B:
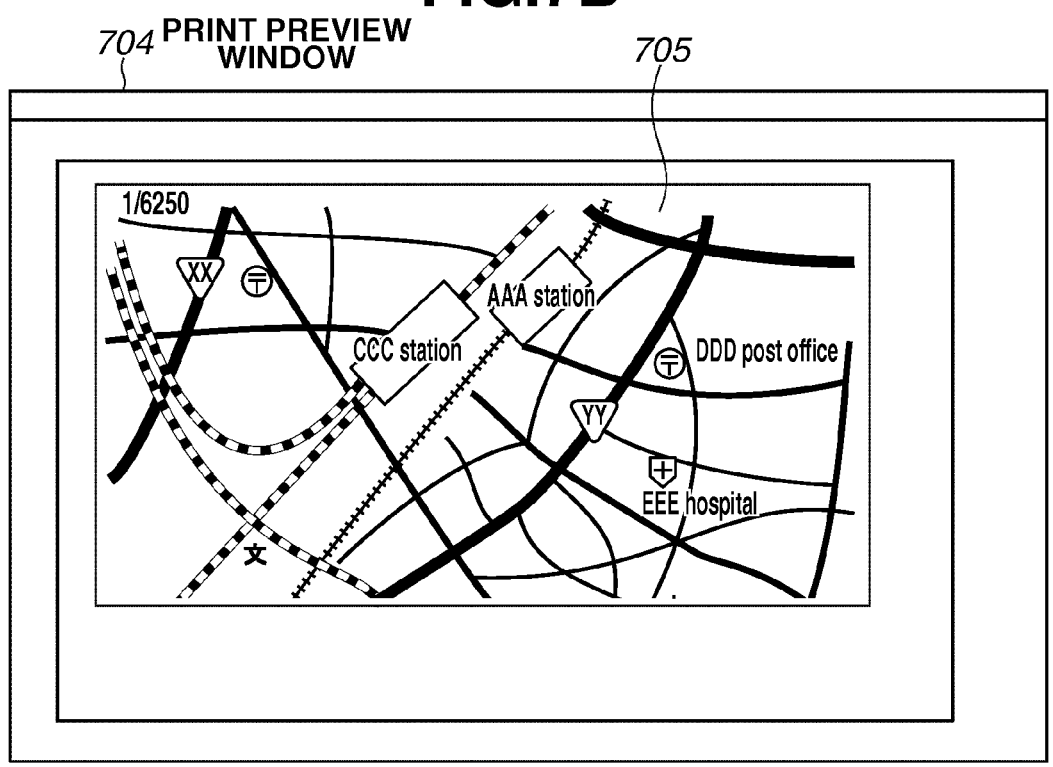

In the present exemplary embodiment, when the map output area change portion 307 calculates the ratio between the sizes of the output areas in step S03, if the ratio of the change differs between the horizontal and vertical lengths of the map output areas, the map output area change portion 307 calculates the ratio between the sizes of the output areas based on the ratio of the change between the horizontal and vertical lengths. In FIG. 7, since the horizontal length is expanded by 1.5 times and the vertical length is expanded by 1.1 times, the area of the output area is expanded by 1.65 times. In this case, in step S04, the scale calculation portion 308 calculates 1:25000×1.65 as a scale after the change of the output area. Next, in step S05, the scale calculation portion 308 selects a map on a scale of 1:5250, which is the closest to the calculated scale, from the scale list. Subsequently, by performing the same processing as that described with reference to FIGS. 6A and 6B, the map application 311 displays a print preview window 704 in FIG. 7B.

An example where a user gives instructions about the output area on a screen as illustrated in FIGS. 7A and 7B has been described. However, for example, the method described with reference to FIGS. 7A and 7B can be used even when a user changes the print setting as illustrated in FIGS. 6A and 6B and when the aspect ratio of the map output area is accordingly changed. For example, when the user changes the sheet size, if the aspect ratio of the sheet size differs between before and after the change, the map output area change portion 307 may calculate the size ratio of the output area based on each magnification ratio of the horizontal and vertical lengths of the sheets.

In the above examples described with reference to FIG. 5A to FIG. 7B, an example where the change of the size ratio between before and after the change is large in a case where the size of the map output area is changed and a new map is acquired. Namely, an example is described where the processing proceeds to step S07 as a result of the determination in steps S02 to S06 in FIG. 4. However, if the size change of the map output area is small, a new map is not acquired. Instead, in step S13, the scale of the map being displayed is changed.

However, there are cases where the change of the scale is inappropriate in step S13 when the aspect ratio of the map output area differs between before and after the change of the size of the map output area. Thus, in the present exemplary embodiment, when a new map is not acquired and the aspect ratio of the map output areas differs, the display area is changed (expanded or reduced), instead of changing the map scale.

Figure 8A:
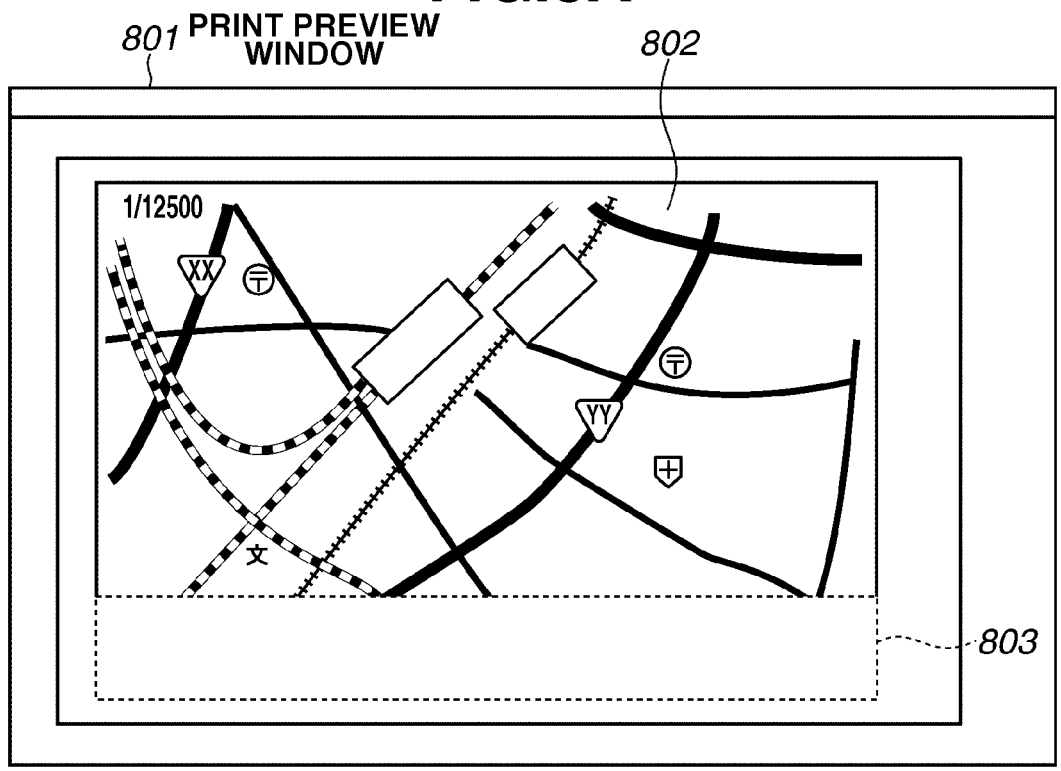
FIGS. 8A and 8B illustrate expansion of a map display area.
Figure 8B:
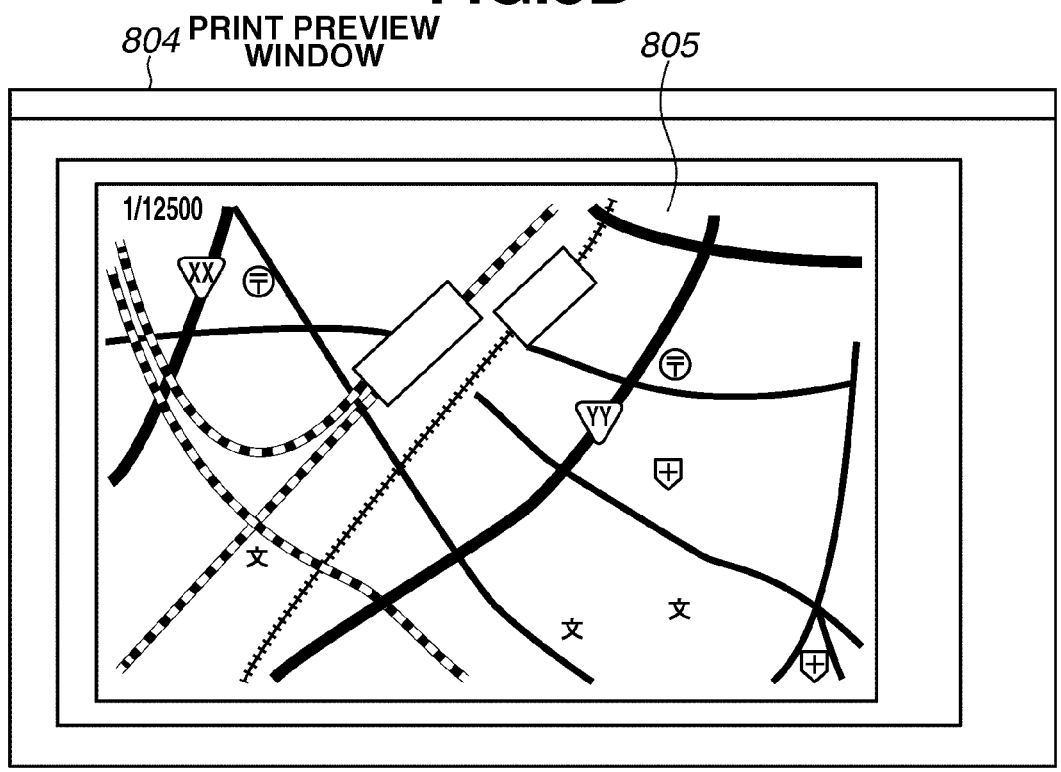

FIGS. 8A and 8B illustrate expansion of a map display area. When a map is displayed as illustrated in FIG. 8A, if a user expands the map output area to an area as illustrated by a dotted line frame 803, the aspect ratio of the map output area is changed between before and after the change of the map output area. In this state, if the scale of the map is changed in step S13, since the map is expanded with expansion ratios different in the horizontal and vertical lengths, the map is displayed with different scales horizontally and vertically. As a result, a map having a horizontal and vertical balance that is different from that of the actual geography of the land is displayed.

Thus, in step S13, the map output editing module 305 expands the display area of the map being displayed. For example, if the map displayed in FIG. 8A is part of the map data stored in the map application 311, the display target area of the map data is expanded, to display the map as illustrated in FIG. 8B. In FIG. 8B, the display area has been expanded in conjunction with the new map output area. Thus, the map application 311 can expand the map output area while maintaining the horizontal and vertical scales in balance.

If the map application 311 stores only the map data of the map displayed in FIG. 8A, the map data acquisition portion 310 acquires new map data. In this case, the map data acquisition portion 310 acquires a map having the same scale as that illustrated in FIG. 8A and having an area matching the map output area determined after the size change. In this way, the map can be displayed appropriately as illustrated in FIG. 8B.

As described above, according to the present exemplary embodiment, a map on a scale matching the size of the output area in which the map is output is acquired. Thus, when the user views the output print product, the user can read the map on a scale that is based on the size of the map. For example, since a detailed map on a large scale is printed on a large sheet, detailed information such as building names and geographical names can be read appropriately. In contrast, since a rough map on a small scale is printed on a small sheet, a simple map without detailed information is printed. Therefore, even if a small sheet is used, the user can easily read the map.

In addition, in the present exemplary embodiment, editing processing is performed even when the map scale is changed so that the area in which the map is output is not changed. For example, even when the display area is expanded on a display screen and a detailed map on a large scale is newly displayed, since the map is cut out within the area of the map that has been displayed before the expansion, the map having the same area as that before the expansion is displayed. Thus, when the scale is changed based on an instruction from the user, an area unnecessary for the user is not included or an area necessary for the user is not excluded in the map to be displayed.

In the above exemplary embodiment, when the output area of the map is changed, a map on a scale that is based on the changed output area is acquired. However, the map acquisition condition is not limited to such a change of the output area. For example, when a map is output in an output area for the first time after the map application is started, a map on a scale that is based on the output area may be output. For example, when a user inputs a map output instruction to the input device 207 by using the map application, a map on a scale that is based on a predetermined size of an output area may be output.

Further, in the above exemplary embodiment, the map application 311 displays a map, determines the scale of a map to be output, selects a map, and acquires a map. However, the present exemplary embodiment is not limited to such operations. For example, the present exemplary embodiment may be realized by causing a Web browser and plug-in software added to the Web browser to cooperate with each other. Namely, the Web browser may acquire map data in a WWW server and display a map, and the plug-in software may determine the scale of the map to be output and select a map.

For example, when the Web browser displays a map, the plug-in software acquires information indicating the size of the output area from the Web browser. Next, based on the size of the output area indicated by the information, the plug-in software determines the scale of the map to be output and requests the Web browser to transmit the map on the determined scale. The Web browser acquires a map requested by the plug-in software from the WWW server and displays the acquired map.

In this configuration, since the Web browser is configured to acquire map data and display a map, the user can realize the present exemplary embodiment by adding the above plug-in software to a normal Web browser. Namely, if a Web browser has already been installed in a PC, the processing described in the present exemplary embodiment can be executed by installing the above plug-in software.

Furthermore, the printer 104 may be configured to include functions of the PC 101 described in the present exemplary embodiment, acquire drawing data, and generate a drawing.

In addition, in the above exemplary embodiment, each time the size of the output area is changed, a map based on the size of the changed output area is acquired from the map database. However, alternatively, map data corresponding to all scales as candidates for the output area may be acquired in advance. In this way, when a map is output, a map may be output based on the map data acquired in advance.

Further, in the above exemplary embodiment, a map is used as a type of the drawing to be output based on drawing data. However, alternatively, the drawing may be a design, or model drawing, etc.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

In addition, a single computer (CPU, MPU) may execute program codes for realizing functions of the present exemplary embodiment or a plurality of computers may cooperate to execute the program codes. In addition, a computer may execute the program codes. Alternatively, hardware devices such as circuits for realizing the functions of the program codes may be provided. In addition, some of the program codes may be realized by hardware devices and the rest of the program codes may be executed by a computer.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-239284 filed Oct. 30, 2012, which is hereby incorporated by reference herein in its entirety.

What is claimed is:
1. A system comprising:
a setting unit configured to set a size of an output area to which an image corresponding to a region in a drawing is output according to a user instruction;
an output control unit configured to cause an output apparatus to output the image corresponding to the region in the drawing to the output area;

wherein the output control unit is configured to cause the output apparatus to output a first image including a content and corresponding to the region in the drawing to the output area of a first size set by the setting unit, and in a case where the setting unit sets the size at a second size larger than the first size, the output control unit causes the output apparatus to output a second image in which the region is not changed from that of the first image and a detail of the content is added.

2. The system according to claim 1, wherein the output control unit causes a display apparatus to display the image corresponding to the region in the drawing to a display as the output area.

3. The system according to claim 1, wherein the output control unit causes a printing device to print the image corresponding to the region in the drawing to a print medium as the output area.

4. The system according to claim 3, wherein the output control unit causes a display device to display the first image in a print preview in a case where the first size of a print medium is set in a print setting by the setting unit, and the output control unit causes the display device to display the second image in a print preview in a case where the second size of the print medium is set in the print setting by the setting unit.

5. The system according to claim 1, wherein, each of the first and second images corresponds to a different scale.

6. The system according to claim 1, further comprising:
an acquisition unit configured to acquire drawing data for outputting the drawing,
wherein the output control unit is configured to cause the output apparatus to output the drawing based on the drawing data acquired by the acquisition unit.

7. The system according to claim 6, wherein the drawing data is stored in a device comprising the acquisition unit or in an apparatus outside the device comprising the acquisition unit.

8. The system according to claim 6, wherein the acquisition unit is configured to acquire a first piece of the drawing data corresponding to the first size and a second piece of the drawing data corresponding to the second size.

9. The system according to claim 6, wherein the drawing data is stored in an apparatus on the internet, and another apparatus comprises the acquisition unit and acquires the drawing data from the apparatus via the internet.

10. The system according to claim 9, wherein, in a case where the first size of the output area is changed to the second size by the setting unit, the another apparatus acquires the second drawing data.

11. The system according to claim 10, wherein the output area includes a print area to where an image corresponding to the region in the drawing is printed by a printing device, and the setting unit changes the size of the print area as the output area in accordance with an instruction from a user.

12. The system according to claim 1, comprising one device comprising comprises the output control unit and the setting unit and a server storing the drawing, and the one device outputs the drawing stored in the server by the output control unit.

13. The system according to claim 12, wherein the one device comprises the output control unit and the setting unit as an application program.

14. The system according to claim 1, wherein the drawing includes a map.

15. The system according to claim 1, wherein, in the second image, a text indicating the content included in the first image is added as the detail.

16. A method comprising:
setting a size of an output area in which an image corresponding to a region in a drawing is output according to a user instruction; and
causing an output apparatus to output the image corresponding to the region in the drawing to the output area;
outputting a first image including a content and corresponding to the region to the drawing to the output area of a first size, and outputting a second image in which the region is not changed from that of the first image and a detail of the content is added in a case where a second size larger than the first size is set.

17. A non-transitory recording medium storing a program for causing a computer to perform the method according to claim 16.

* * * * *